United States Patent
Chonnad et al.

(10) Patent No.: US 12,524,589 B2
(45) Date of Patent: Jan. 13, 2026

(54) FUNCTIONAL SAFETY MECHANISMS FOR INPUT/OUTPUT (IO) CELLS

(71) Applicant: Synopsys, Inc., Mountain View, CA (US)

(72) Inventors: Shivakumar Shankar Chonnad, San Jose, CA (US); Vladimir Litovtchenko, Bavaria (DE); Sowjanya Syamala, Bengaluru (IN); Nidhi Bhasin, Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 698 days.

(21) Appl. No.: 17/946,642

(22) Filed: Sep. 16, 2022

(65) Prior Publication Data

US 2023/0098071 A1    Mar. 30, 2023

(30) Foreign Application Priority Data

Sep. 17, 2021 (IN) .............................. 202141042136

(51) Int. Cl.
*G06F 30/30* (2020.01)
*G01R 31/317* (2006.01)
*G01R 31/3193* (2006.01)
*G06F 11/07* (2006.01)
*G06F 13/40* (2006.01)

(52) U.S. Cl.
CPC ....... *G06F 30/30* (2020.01); *G01R 31/31716* (2013.01); *G01R 31/31932* (2013.01); *G06F 11/0745* (2013.01); *G06F 11/079* (2013.01); *G06F 13/4059* (2013.01)

(58) Field of Classification Search
USPC ........................................................ 716/136
See application file for complete search history.

(56) References Cited

U.S. PATENT DOCUMENTS

2014/0189457 A1 * 7/2014 Mak ................. G01R 31/31716
                                                       714/745

* cited by examiner

*Primary Examiner* — Brian Ngo
(74) *Attorney, Agent, or Firm* — Lowenstein Sandler LLP

(57) ABSTRACT

Data retrieved from a portion of a device is obtained at a transmission buffer through an input/output (IO) cell of the device. The data is provided from the transmission buffer to a receiving buffer through the IO cell. The data is obtained from the receiving buffer. Responsive to a detection of a first mismatch between the data retrieved from the portion of the device and the data obtained from the receiving buffer, a fault is determined to have occurred at one or more of the transmission buffer or the receiving buffer.

17 Claims, 11 Drawing Sheets

900

```
┌─────────────────────────────────────────────────────────────────────────┐
│ Identify first data stored at a transmission buffer through an input/output │
│                    (IO) cell through a device 910                        │
└─────────────────────────────────────────────────────────────────────────┘
                                     │
                                     ▼
┌─────────────────────────────────────────────────────────────────────────┐
│    Identify second data stored at a receiving buffer through the IO cell 912 │
└─────────────────────────────────────────────────────────────────────────┘
                                     │
                                     ▼
┌─────────────────────────────────────────────────────────────────────────┐
│   Provide the first data and the second data as an input to an exclusive-or │
│                    (XOR) logic gate of the IO cell 914                   │
└─────────────────────────────────────────────────────────────────────────┘
                                     │
                                     ▼
┌─────────────────────────────────────────────────────────────────────────┐
│  Determine, based on an output of the XOR logic gate, that a mismatch is │
│         present between the first data and the second data 916           │
└─────────────────────────────────────────────────────────────────────────┘
                                     │
                                     ▼
┌─────────────────────────────────────────────────────────────────────────┐
│   Transmit a signal indicating a fault at one or more of a the transmission │
│                  buffer or the receiving buffer 918                      │
└─────────────────────────────────────────────────────────────────────────┘
```

FIG. 9

FUNCTIONAL SAFETY MECHANISMS FOR INPUT/OUTPUT (IO) CELLS

RELATED APPLICATIONS

This application claims the benefit of Indian Patent Application number 202141042136, filed Sep. 17, 2021, the entire contents of which are hereby incorporated by reference herein.

TECHNICAL FIELD

The present disclosure relates to the field of integrated circuit design, and in particular, to functional safety mechanisms for input/output (IO) cells.

BACKGROUND

Functional safety is an important metric in integrated circuit (IC) designs, such as System-on-Chip (SoC) designs. In automotive applications, IC designs include added logic (e.g., safety mechanisms) based on size, functions, and variables of the IC design. Such added logic can increase the complexity of the IC design. With humans, electronics, and machines interacting amongst each other in real time, the combinations of outcomes to be addressed define the complexity of the ICs in the vehicle. To collect the data related to various functional safety related aspects, a Failure Mode and Effects Analysis (FMEA) or Fault Tree Analysis (FTA) is conducted.

The FMEA process includes many steps, two of the key items in it are to capture the various failure modes in the design, and what their effects are. A safety related design can include non-safety-critical logic and safety-critical logic. The FMEA may be conducted at a hardware subpart level for the different hierarchies in the design. A given hardware subpart can have multiple failure modes and their corresponding effects. Suitable safety mechanisms are identified to detect, control and/or mitigate failure modes in the safety related logic. Safety mechanisms can include logic implemented within the hardware and/or software, to detect occurrence of failures, and report it to the system in order to prevent faults from leading to failure.

SUMMARY

In one embodiment, a processing device obtains data retrieved from a portion of a device at a transmission buffer through an input/output (IO) cell of the memory device. The processing device provides the data from the transmission buffer to a receiving buffer through the IO cell. The processing device obtains the data from the receiving buffer. In response to detecting a first mismatch between the data retrieved from the portion of the device and the data obtained from the receiving buffer, the processing device determines that a fault has occurred at one or more of the transmission buffer or the receiving buffer.

In one or more embodiments, a system includes a memory storing instructions and a processor coupled with the memory to execute the instructions. The instructions, when executed, cause the processor to receive data to be programmed to one or more memory cells of the memory. The instructions further cause the processor to provide the received data to a receiving buffer of an input/output (IO) cell. The instructions further cause the processor to transmit the received data from the receiving buffer to a latching component of the IO cell. The instructions further cause the processor to transmit the data from the latching component to a transmission buffer of the IO cell. The instructions further cause the processor to obtain the data from the transmission buffer. The instructions further cause the processor to, in response to detecting a mismatch between the received data at the receiving buffer and the data obtained from the transmission buffer, determine that a fault has occurred at one or more of the receiving buffer or the transmission buffer.

In one or more embodiments, a processing device obtains first data at a transmission buffer through an input/output (IO) cell of a device. The processing device obtains second data at a receiving buffer through the IO cell. The processing device provides the first data and the second data as an input to an exclusive- or (XOR) logic gate of the IO cell. The processing device determines, based on an output of the XOR logic gate, whether a mismatch is detected between the first data and the second data. A mismatch indicates a fault at one or more of the transmission buffer or the receiving buffer. Responsive to determining that the mismatch is detected between the first data and the second data, the processing device transmits, to a processor of the device, a signal indicating the fault at the one or more of the transmission buffer or the receiving buffer.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 9 is a flow diagram illustrating another example method for a functional safety mechanism of an IO cell, in accordance with some embodiments of the present disclosure.

DETAILED DESCRIPTION

Figure 1:
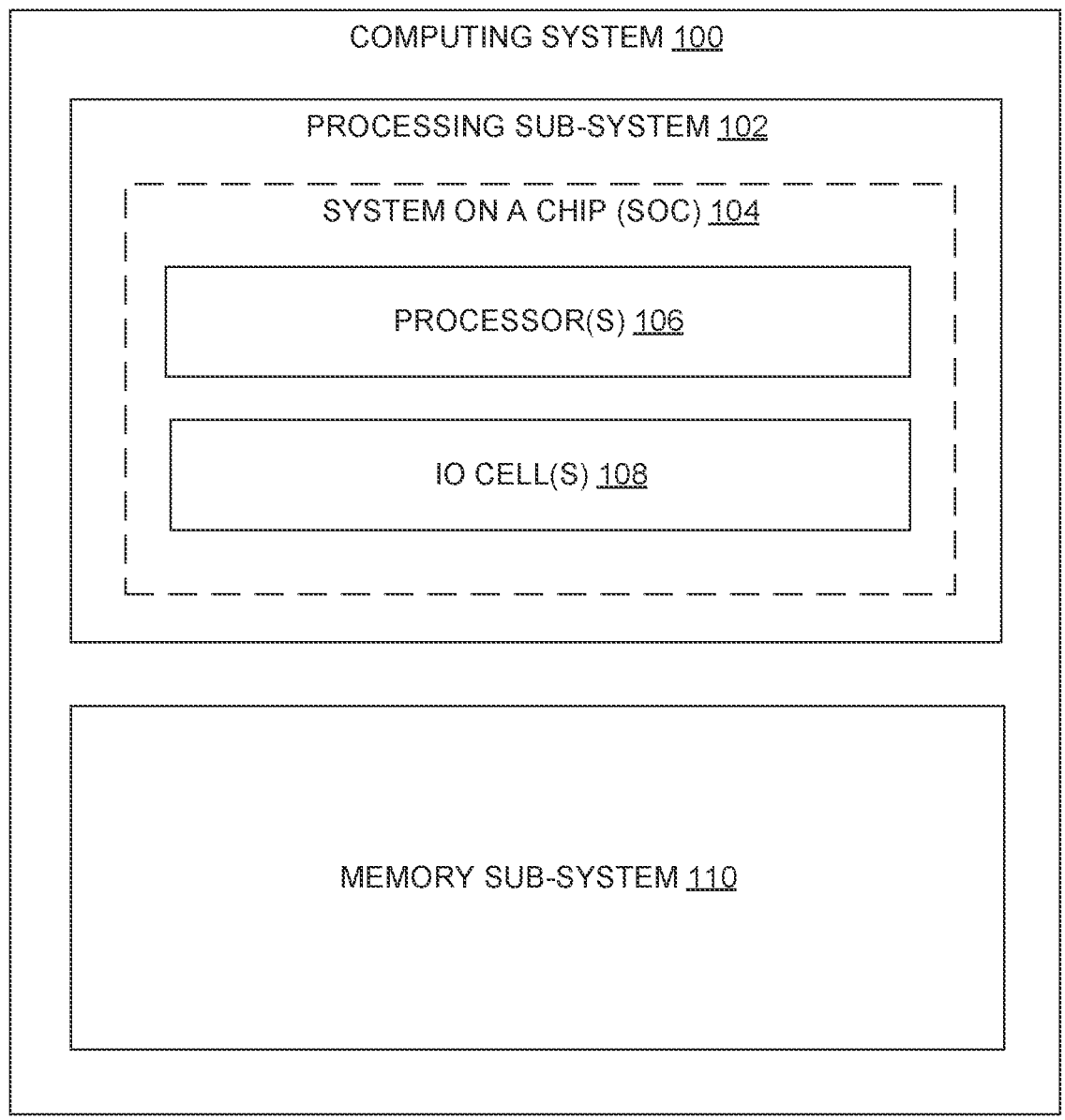
FIG. 1 illustrates an example computing system, in accordance with some embodiments of the present disclosure.

Aspects of the present disclosure relate to the field of integrated circuit design, and in particular to functional safety mechanisms for input/output (IO) cells. Integrated circuits (ICs) can include multiple circuit elements that interact with each other. For example, a System-on-Chip (SoC) can include multiple blocks (e.g., intellectual property (IP) blocks) that are designed to perform a particular function for the SoC. Logic for circuit elements of an IC (referred to herein as internal logic or core logic) can communicate with logic of a computing system outside of the IC (e.g., referred to herein as external logic or system side logic) via input/output (IO) cells. Input/output (IO) cells refer to cells (e.g., periphery cells) that facilitate communication between logic of a device for a computing system and logic of the computing system. An IO cell can facilitate translation of signals within a SoC to a signal that can be interpreted by the logic outside of the SoC. IO cells can include General Purpose IO Cells (GPIO) cells, in some instances.

An IO cell can include a receiving buffer (referred to as an RX buffer herein) and/or a transmission buffer (referred to as a TX buffer herein). The RX buffer can transfer data associated with a signal received by the IO cell from the external logic to the internal logic and the TX buffer can transfer data associated with a signal transmitted from the internal logic to the external logic. In some instances, a fault can occur at a computing system. A fault refers to an abnormal condition that causes one or more components of the system to fail. The fault can occur within the RX buffer and/or the TX buffer, in some instances.

Without adequate safety mechanisms (i.e., a mechanism to detect, report, control, and/or mitigate failure in IO cells or outside of IO cells) a fault can propagate undetected throughout a computing system leading to an unsafe state and violation of safety requirements. For example, in some systems, a fault occurring within the TX buffer or the RX buffer can propagate throughout the system undetected, either into the external logic or the internal logic. Even if the fault is detected (e.g., by the external logic), it can be difficult to pinpoint whether the root cause of the fault was within an IO cell or other logic elements along the way. Even if the fault is detected in the IO cell and/or the cause of the fault is identified, safety mechanisms put in place for detection, control or mitigation (i.e., either upstream or downstream from the IO cell) are located outside of the IO cell, causing potential processing or analyzing delay by the time the issue is identified and resolved (e.g., leading to too late reaction of the system). For example, the safety mechanism in the downstream or upstream logic may not be capable of continuously monitoring the traffic within a path to ascertain a real time detection of the fault. In another example, the effective diagnostic coverage of a designated safety mechanism that is located in the upstream or downstream logic can potentially be lower depending on the periodicity of sampling the data to determine the occurrence of a fault.

In view of the above, conventional systems can perform several elimination operations to isolate where a fault has occurred. An example elimination technique can include analyzing a data path for various probe points of the IO cell and/or supporting logic through the data path to identify components where the fault occurred. Such elimination techniques depend on the availability of suitable probe points or supporting logic through the data path, to aid indication of any kind of occurrence/non-occurrence of a fault in a particular section of the logic, which may not always be available. In addition, such elimination techniques can potentially consume processing time (e.g., of a processor connected to the IO cell) or hinder positive detection of where the fault occurs.

Some systems can include one or more mechanisms outside of the IO cell (referred to as external mechanisms) that are configured to identify faults internal to IO cell. For example, a pattern generator mechanism (e.g., of system side logic, of core logic, etc.) can transmit data to a RX buffer through an IO cell. Such data can have a particular data pattern, which is defined or configured by the pattern generator mechanism. A pattern receiver mechanism (e.g., of system side logic, of core logic, etc.) can receive the data from a TX buffer through the IO cell and a pattern checker mechanism (e.g., of system side logic, of core logic, etc.) can determine whether a mismatch is detected between a pattern of the data received from the TX buffer and the pattern of the data provided to the RX buffer. As indicated above, such mechanisms are implemented by logic outside of the IO cell rather than internal to the IO cell, which can lead to delays as the pattern receiver mechanism and the pattern checker mechanism wait for the data to be available through the TX buffer. Further, detecting a mismatch between the pattern of the data received from the TX buffer and the pattern of the data provided to the RX buffer does not necessarily indicate whether the fault is in the IO cell or in the pattern checker logic, and therefore the location of the fault may not be accurately identified. Further, in order for such mechanisms to effectively detect faults in the IO cell, the core logic and/or the system side logic is to be updated to perform integrity testing on the pattern checker safety mechanism to detect latent faults. Such integrity testing can be time consuming and can consume a significantly large amount of system resources (e.g., computing resources), which can make such resources unavailable for other processes of the system.

Implementations of this disclosure address the above-mentioned and other deficiencies by providing techniques for functional safety mechanisms for IO cells. In some embodiments, such functional safety mechanisms can include an internal loopback safety mechanism which is internal to the IO cells. Logic of the internal loopback safety mechanism can enable one or more buffers that can be used to disable communication of the IO cells with core logic and/or system side logic. Once communication with core logic and/or system side logic is disabled, logic of the internal loopback safety mechanism can enable data flow from a transmission buffer (e.g., a TX buffer) through the IO cell to a receiving buffer (e.g., a RX buffer) through the IO cell. Logic running the internal loopback safety mechanism can obtain the data at the receiving buffer and a pattern checker of the internal loopback safety mechanism can determine whether a mismatch is detected between the data at the TX buffer and the data obtained from the RX buffer. If a mismatch is detected, logic of the internal loopback safety mechanism can determine a fault has occurred at the TX buffer or the RX buffer.

In additional or alternative embodiments, logic of the internal loopback safety mechanism may not disable communication of the IO cells with core logic and/or system side logic. In such embodiments, logic of the internal loopback safety mechanism can provide a data stream of the TX buffer and the RX buffer as input to an exclusive- or (XOR) logic gate. An output of the XOR logic gate can indicate a match (or mis-match) between the data streams. Logic of the internal loopback safety mechanism can determine whether a mismatch is detected between the first data stream and the second data stream, where a mismatch indicates a fault at one or more of the TX buffer, the RX buffer, and/or a communication path between one or more components of the device and the TX buffer. If a mismatch is detected, a signal is transmitted to a processor of the device, the signal indicating the fault at the TX buffer, the RX buffer, and/or the communication path. Further details regarding the internal loopback safety mechanism are provided herein.

In additional or alternative embodiments, such functional safety mechanisms for IO cells can include an external loopback safety mechanism. Logic of the external loopback safety mechanism can enable a retention latch of the IO cell. A retention latch refers to a component that retains the state of a cell (e.g., an IO cell) even when a main power supply to the cell is shut off. Logic of the external loopback safety mechanism can receive data to be programmed to one or more memory cells of a memory for a device and provide the received data to the RX buffer of the IO cell. The safety mechanism logic can transmit the data from the receiving buffer to the latching component and provide the data from the latching component to a TX buffer of the IO cell. The logic can obtain the data from the TX buffer and determine whether a mismatch is detected between the data at the RX buffer and the data obtained from the TX buffer. If a mismatch is detected, the logic can determine that a fault has occurred at one or more of the RX buffer or the TX buffer. Further details regarding the external loopback safety mechanism are provided herein.

Embodiments of the present disclosure include additional safety mechanisms for detecting a fault at components (e.g., a TX buffer, a RX buffer, etc.) of an IO cell. For example, embodiments of the present disclosure further provide a mechanism for detecting a fault based on diodes and/or voltage clamps for an IO cell. In another example, embodiments of the present disclosure further provide a mechanism for detecting a fault based on a hardware redundancy analysis for the IO cell. Further details regarding such mechanisms are provided herein.

Aspects of the present disclosure address the above and other deficiencies by providing techniques for detecting and identifying a source of faults at an IO cell for an integrated circuit (IC). The safety mechanisms of the present disclosure can detect faults and identify a source of the detected faults using logic of an IO cell. Accordingly, core logic and/or system side logic is not relied on to detect faults, making resources of the IC and/or other components of the device available for other processes. For example, using the retention latch of the external loopback safety mechanism scheme enables logic of the IO cell to detect and/or identify a source of faults without dependency on a core side register, making the register available for other processes. Logic of the internal loopback scheme tests data paths to the transmission buffer and the receiving buffer of the IO cell, which enables logic of the IO cell to accurately detect and identify a source of faults within the IO cell without depending on core logic and/or system side logic. In addition, one or more safety mechanisms of the present disclosure enable logic of the IO cell to continuously monitor faults at the IO cell, which can improve overall fault detection for the device and, in some instances, improve overall safety for a system (e.g., an automotive system) that includes the device.

FIG. 1 illustrates an example computing system 100, in accordance with some embodiments of the present disclosure. As illustrated in FIG. 1, computing 100 can include a processing sub-system 102 and/or a memory sub-system 110. In some embodiments, processing sub-system 102 can include one or more integrated circuits (IC), in accordance with embodiments of the present disclosure. For example, processing sub-system 102 can include a system-on-a-chip (SOC) 104, in some embodiments. It should be noted that although FIG. 1 depicts SOC 104 and some embodiments of the present disclosure refer to SOC 104, embodiments of the present disclosure can be applied to other types of integrated circuits.

SOC 104 can include one or more processor(s) 106 and/or one or more IO cell(s) 108. Processor(s) 106 can include one or more central processing units (CPUs), graphics processing units (GPUs), digital signal processors (DSPs), neural processing units (NPUs), and so forth. In some embodiments, processor(s) 106 can be general purpose processing units. In other or similar embodiments, processor(s) 106 can be special purpose processing units that are configured to support various functions, such as video, audio, graphics, gaming, artificial networks, etc.

IO cell(s) 108 can include cells (e.g., periphery cells) that facilitate communication between logic of a device for a computing system (e.g., computing system 100) and logic of the computing system. In some embodiments, IO cell(s) 108 can facilitate communication between logic of processor(s) 106 of SOC 104 and logic outside of SOC 104 and/or processing sub-system 102. IO cells 108 can include General Purpose IO (GPIO) cells, in some embodiments. For purposes of explanation and illustration only, logic of components and/or elements of SOC 104 (e.g., logic of processor(s) 106) is referred to herein as internal logic or core logic and logic of components and/or elements outside of SOC 104 is referred to as external logic or system side logic.

IO cell(s) 108 can include one or more safety mechanisms that are configured to detect a fault that occurs at one or more components or elements of IO cell(s) 108 and/or identify the one or more components or elements of IO cell(s) that caused the detected fault. As indicated above, a fault refers to an abnormal condition that causes a component or element to fail. A fault can include a dangerous fault (e.g., a fault that will significantly increase the likelihood of system 100 violating a safety goal or target), a single-point fault (e.g., a fault in a hardware element that directly leads to the violation of a safety goal or target), and/or a permanent fault (e.g., a fault that remains at a component or element until the component or element is removed or repaired). In some instances, a fault can lead to a failure of system 100 (e.g., if the fault is not detected and addressed). Further details regarding IO cell(s) 108 and safety mechanisms associated with IO cell(s) 108 are provided herein.

Memory sub-system 110 can include a storage device, a memory module, or a combination of a storage device and memory module, in some embodiments. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, a hard disk drive (HDD), and so forth. Examples of a memory module includes a dual in-line memory module (DIMM), a small outline DIMM (SO-DIMM), and various types of non-volatile dual in-line memory modules. In some embodiments, memory sub-system 110 can include one or more memory devices that each include memory cells configured to store data. In some embodiments, IO cell(s) 108 can facilitate communication between logic of processor(s) 106 and logic of memory sub-system 110 (e.g., logic of a controller for memory sub-system 110). In additional or alternative embodiments, one or more components of memory sub-system 110 can reside at or be included as part of SOC 104.

It should be noted that computing system 100 is an example computing system in accordance with embodiments of the present disclosure. In some embodiments, computing system 100 can include one or more additional or fewer components. For example, SOC 104 can include one or more additional components or elements. IO cell(s) 108 can facilitate communication between core logic or internal logic associated with the one or more additional components or elements and system side logic, in accordance with embodiments described herein.

Figure 2A:
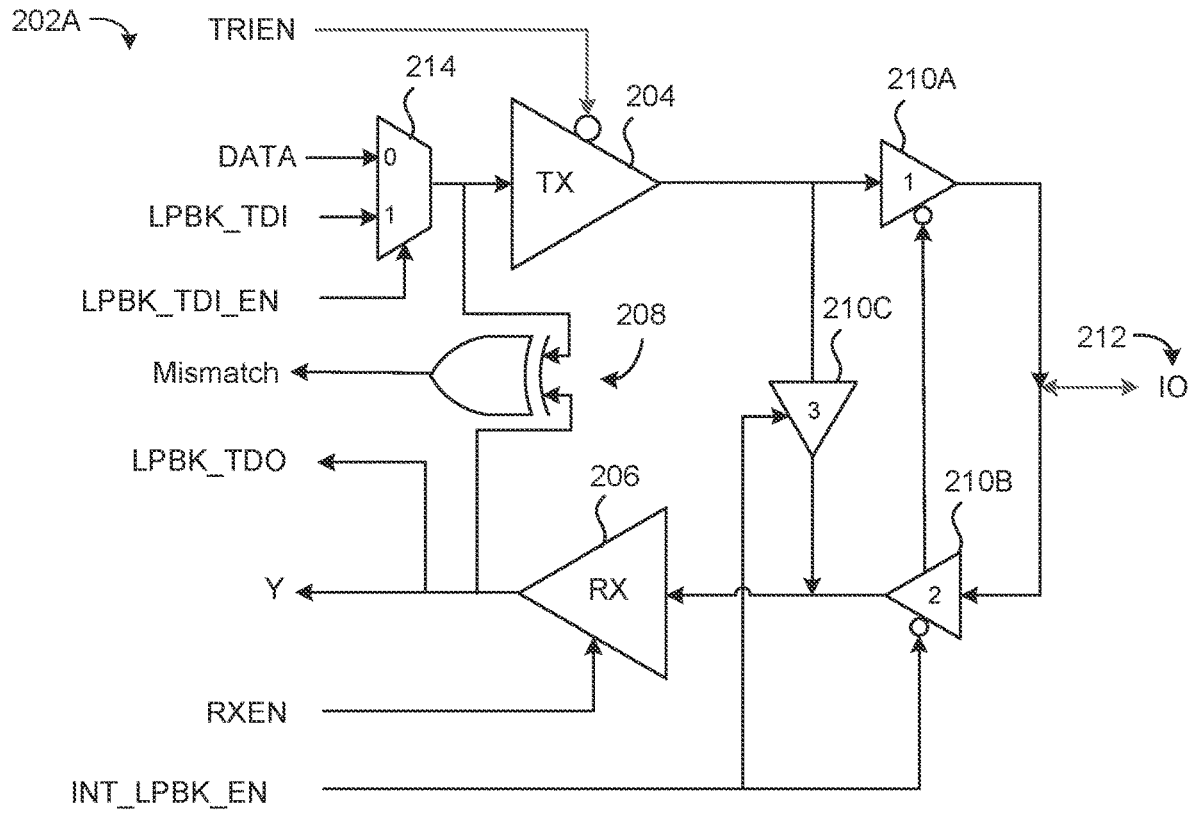
FIGS. 2A-2B illustrate example input/output (IO) cells including an internal loopback safety mechanism, in accordance with some embodiments of the present disclosure.
Figure 2B:
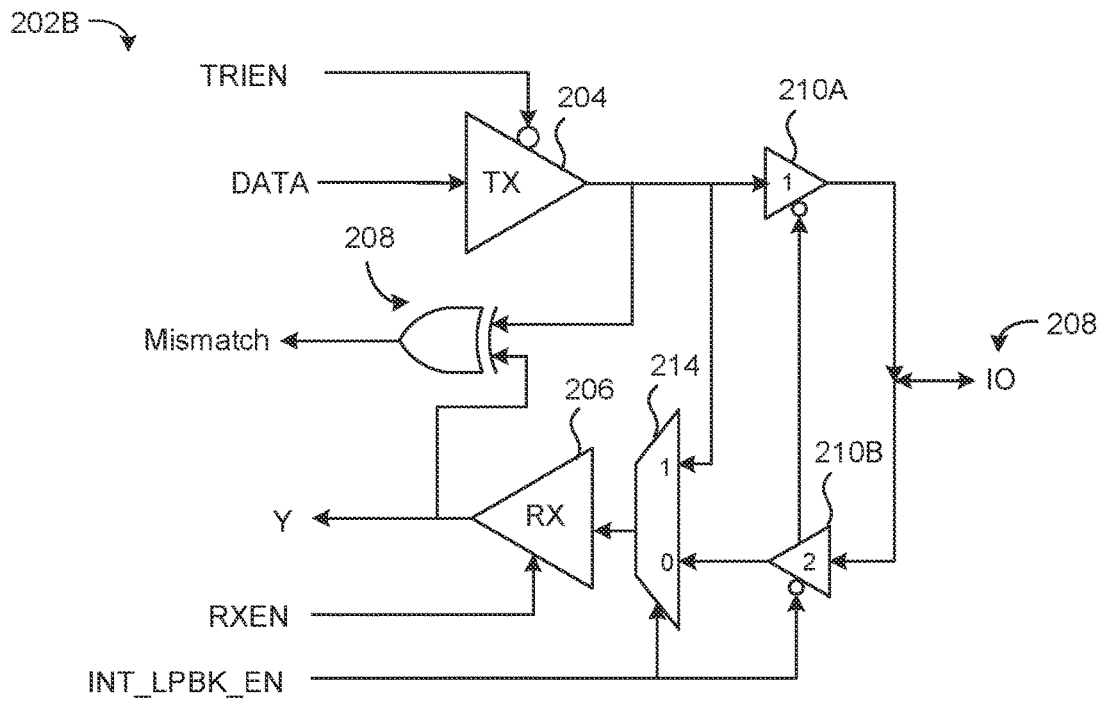

FIGS. 2A-2B illustrate example input/output (IO) cells 202 (e.g., IO cell 202A, IO cell 202B) including an internal loopback safety mechanism, in accordance with some embodiments of the present disclosure. In some embodiments, IO cells 202A and/or 202B, can be the same as or similar to IO cell(s) 108, described with respect to FIG. 1. IO cells 202A and/or 202B may be made of components configured to transmit and/or receive signals from a logic within an IC (e.g., a chip) to the world outside the integrated circuit, and vice-versa. IO cells 202A and/or 202B may additionally serve signal level translations, in some embodiments.

IO cells 202A and/or 202B may each have a transmission (TX) buffer 204 and/or a receiving (RX) buffer 206. "TRIEN," as illustrated in FIGS. 2A-2B refers to a signal for enabling TX buffer 204. "RXEN" refers to a signal for enabling RX buffer 206. A signal for enabling a buffer (also referred to as an enable signal herein) can be a signal that activates one or more elements (e.g., pins) of IO cell(s) 202 to allow for data to pass to the buffer. "DATA," as illustrated in FIG. 2A refers to a pin that transmits input data provided from core logic to the TX buffer 204. "Y" refers to a pin that transmits output data provided from system side logic the core logic through RX buffer 206.

As indicated above, IO cells 202 of FIGS. 2A-2B include internal loopback safety mechanism logic. Such logic can detect an occurrence of a fault within IO cell 202 by determining whether a pattern of data obtained from TX buffer 204 matches a pattern of data obtained from RX buffer 206, and vice versa. In some embodiments, IO cells 202A and/or 202B can include a pattern checker element 208. The pattern checker element 208 can be configured to compare data or data streams through TX buffer 204, RX buffer 206, and/or other components of IO cells 202A and/or 202B or system 100, in accordance with embodiments described herein. In some embodiments, pattern checker element 208 can be or can include one or more logic gates. For example, as illustrated in FIGS. 2A-2B, pattern checker element 208 can be or can include an exclusive- or (XOR) logic gate. It should be noted that pattern checker element 208 can be or can include other types of logic gates, in accordance with embodiments of the present disclosure. In some embodiments, the internal loopback safety mechanism logic can initiate one or more processes to detect a fault and/or identify a source of the fault in response to detecting a signal from core logic, system side logic, or other logic of IO cell(s) 202. The signal can indicate to the internal loopback safety mechanism logic that a fault test is to be initiated. In some embodiments, the signal can indicate data (e.g., at memory sub-system 110) that is to be used to perform the fault test. In such embodiments, logic of the internal loopback safety mechanism (referred to simply as "safety mechanism logic" herein) retrieves the data indicated by the signal from memory sub-system 110 and provides the retrieved data to pattern checker element 208. In some embodiments, safety mechanism logic can additionally or alternatively provide the retrieved data to TX buffer 204.

In some embodiments, in response to detecting the signal, safety mechanism logic can pause data traffic across the IO cell 202. Data traffic refers to data streams between core logic and system side logic during normal operation of system 100. Safety mechanism logic can pause the data traffic by issuing one or more control signals (e.g., an internal loopback enable signal, or "INT_LPBK_EN"). In some embodiments, the control signal can enable one or more buffers 210 at IO cell(s) 202 and can cause signals transmitted from core logic and/or from system side logic to be transmitted to the one or more buffers 210. As illustrated in FIG. 2A, the one or more buffers 210 can include a first buffer 210A, a second buffer 210B, and a third buffer 210C. In additional or alternative embodiments, the one or more buffers 210 can include first buffer 210A and second buffer 210B, as illustrated in FIG. 2B. In some embodiments, the control signal(s) can disable communication of core logic to an IO pin 212 of cell 202. Disabling communication to the IO pin 212 can include disabling drives to the IO pin 212 and/or, receiving data or other signals from IO pin 212. By disabling communication to IO pin 212, IO cell 202 effectively disconnects core logic from communicating with system side logic. If signals are transmitted from core logic to IO pin 212 while communication to IO pin 212 is disabled, data of such signals can be provided to first buffer 210A and/or second buffer 210B, in some embodiments. For example, data associated with drives to IO pin 212 can be provided to first buffer 210A and data associated with signals to IO pin 212 can be provided to second buffer 210B. It should be noted that, in some embodiments, suitable pull up and/or pulldown resistors can be included at IO cell 202 (e.g., between IO pin 212 and buffers 210). In some embodiments, the suitable pull up and/or pulldown resistors can prevent any floating conditions.

In additional or alternative embodiments, the first control signal(s) can enable a connection between an output of TX buffer 204 and an input of RX buffer 206 by enabling a connection (e.g., a physical connection) between TX buffer 204 and RX buffer 206 with third buffer 210C. The connection to third buffer 210C can originate and end as close to the IO pin 212 as possible (e.g., with minimal intervening components or elements between IO pin 212 and buffer 210C).

In some embodiments, safety mechanism logic issues another signal (e.g., a loopback test data input enable signal, or "LPBK_TDI_EN"), which causes the input to TX buffer 204 (e.g., via "DATA") to be multiplexed with another signal (e.g., a loopback test data input signal, or "LPBK_TDI"). Prior to issuing the enable signal, a pin for the enable signal (e.g., "LPBK_TDI_EN"), may be disabled so the "DATA" propagates through the multiplexor into TX buffer 204. In some embodiments, multiplexing "DATA" with "LPBK_TDI" can encode a unique pattern into data from "DATA" that can be checked against data from "Y" obtained from RX buffer 206, as described herein. Safety mechanism logic can provide the multiplexed data from "DATA" at TX buffer 204 can to pattern checker element 208, in some embodiments, as illustrated in FIG. 2A.

In some embodiments, safety mechanism logic can initiate the internal loopback test issuing an enabling signal (e.g., a loopback test data input enable signal, or "INT_LPBK_EN"), which can enable data to be passed to third buffer 210C and/or disable (e.g., prevent data from passing through) first buffer 210A and/or second buffer 210B. In some embodiments, safety mechanism logic can additionally or alternatively issue one or more signals (e.g., "TRIEN" and/or "RXEN") to enable TX buffer 204 and/or RX buffer 206. In some embodiments, safety mechanism logic can provide data at TX buffer 204 (e.g., and multiplexed with "LPBK_TDI") to third buffer 210C. Safety mechanism logic can then provide the data at third buffer 210C to RX buffer 206. Safety mechanism logic can receive the data through RX buffer 206 (e.g., through "Y," as described above) to pattern checker element 208. Pattern checker element 208 can compare the multiplexed data from "DATA" with data from "Y" obtained from RX buffer 206 to determine whether there is a mismatch between a pattern of the data of multiplexed "DATA" and a pattern of the data of "Y." If no mismatch is identified between the pattern of multiplexed "DATA" and the pattern of "Y," pattern checker element 208 can determine that there is no error present at IO cell(s) 202. If a mismatch is identified, pattern checker element 208 can flag the mismatch as an error. In some embodiments, safety mechanism logic can transmit an interrupt to system 100 indicating the error.

As illustrated in FIG. 2A, pattern checker element 208 compares the multiplexed data of "DATA" and "Y" based on the input from TX buffer 204 and RX buffer 206, which is closest to the core side. Accordingly, the pattern checker element 208 can test the full data paths for TX buffer 204 and RX buffer 206 (e.g., from TX buffer 204 to IO pin 212 and from RX buffer 206 to IO pin 212) in isolation and can flag an error if a mismatch of multiplexed data of "DATA" and "Y" is detected. In some embodiments, pattern checker element 208 can operate as a redundant hardware checker for a pattern checker residing at system side logic and/or core logic to help confirm if any fault occurs in the pattern checker of system side logic and/or core logic.

As indicated above, pattern checker element 208 may detect a mismatch between a pattern of multiplexed "DATA" and a pattern of "Y." If a mismatch is detected, safety mechanism logic can initiate one or more operations to test the logic of pattern checker element 208 and determine whether the mismatch detection was accurate (e.g., whether the pattern checker 208 and/or a source of the data transmission is functioning correctly). In some embodiments, safety mechanism logic can issue a signal (e.g., "LPBK_TDI_EN") to activate a loopback test pin of multiplexor 214 of IO cell(s) 202 and enable an input data signal (e.g., "LPBK_TDI") as input to the data path for TX buffer 204. Safety mechanism logic can generate or otherwise obtain test data (e.g., from core logic, from system side logic, from other logic of IO cell(s) 202) and can provide the test data to multiplexor 214. Multiplexor 214 can multiplex the test data with "LPBK_TDI" signal (e.g., provided via the activated pin). In some embodiments, the "LPBK_TDI" signal can be driven from a source other than a pattern generator (e.g., a multiplexor of IO cell(s) 202). For example, the "LPBK_TDI" signal can be driven from a source within the core logic or as a top-level signal.

In some embodiments, safety mechanism logic can receive the test data through RX buffer 206. Safety mechanism logic can obtain an output data signal (e.g., "LPBK_TDO") from RX buffer 206 and compare the obtained data to the test data multiplexed with "LPBK_TDI." If no mismatch is detected between the data of "LPBK_TDO" and the test data, safety mechanism logic can determine that the mismatch indicated by pattern checker element 208 is caused by a fault at the TX buffer 204 and/or RX buffer 206. If, however, a mismatch is detected between "LPBK_TDO" and the test data, safety mechanism logic can determine that the mismatch indicated by pattern checker element 208 is not caused by an issue with pattern checker element 208 and no fault may actually be present at IO cell(s) 202.

In some embodiments, "LPBK_TDO" signal can be sent to the source driving the "LPBK_TDI" signal for additional comparison (e.g., by core logic, by system side logic, etc.). As indicated previously, the above described mechanism enables safety mechanism logic to determine whether a mismatch detected by pattern checker element 208 was caused by an issue within the TX buffer 204, RX buffer 206 or the TX- or RX-related logic within IO cell(s) 202. Additionally, the above described mechanism (e.g., involving the LPBK_TDI and LPBK_TDO signals) can serve as a useful alternate hardware implementation to isolate an issue in an overall implementation of the pattern generation and pattern checking (e.g., implemented by core logic, system side logic, and/or other logic of IO cell(s) 202).

In some embodiments, RX buffer 206 can be tested independently of TX buffer 204. In accordance with embodiments of FIG. 2B, IO cell 202B can include first buffer 210A and second buffer 210B, as described above. Safety mechanism logic can issue a control signal (e.g., "INT_LPBK_EN") to disable first buffer 210A and second buffer 210B, which disconnects IO cell 202B from system side logic. The control signal can additionally or alternatively enable a multiplexor (e.g., multiplexor 214) to set the input of RX buffer 206 as the output of RX buffer 204. In some embodiments, safety mechanism logic can issue a "TRIEN" signal and a "RXEN" signal to enable TX buffer 204 and RX buffer 206, respectively. Once the "TRIEN" and "RXEN" signals are issued, safety mechanism logic can obtain data from a pattern generator of core logic and provide the obtained data to TX buffer 204 (e.g., through "DATA"). The data can be provided as input to multiplexor 214, which provides the data to RX buffer 206 (e.g., according to the flow path illustrated by FIG. 2B). Safety mechanism logic can obtain data from TX buffer 204 and from RX buffer 206 and can provide the obtained data to pattern checker element 208, as described above. Pattern checker element 208 can detect a mismatch between the data obtained from TX buffer 204 and the data of RX buffer 206, in accordance with previously described embodiments. If a mismatch is detected, safety mechanism logic can determine that a fault has occurred at RX buffer 206 and can transmit an indication of the fault (e.g., via an interrupt signal) to core logic and/or system side logic, as described above. In some embodiments, safety mechanism logic can initiate a test (e.g., as described with respect to FIG. 2B) to determine whether a mismatch is caused by RX buffer 206 or an issue with logic of pattern checker element 208. Safety mechanism logic may determine that no fault has occurred if a mismatch is not detected, in some embodiments.

It should be noted that, in some embodiments, pattern checker element 208 can be used to detect for faults in real time based on data of data streams for TX buffer 204 and/or RX buffer 206. For example, safety mechanism logic can issue the "RXEN" signal such that RX buffer 206 is always enabled to receive data as an output from TX buffer 204 (e.g., in addition to data received from system side logic), in some embodiments. In such embodiments, data can be obtained from RX buffer 206 and/or multiplexor 214 (e.g., data provided to TX buffer 204) and pattern checker element 208 can detect a mismatch between data obtained from RX buffer 206 and data provided to TX buffer 204 during operation of system 100 (e.g., "on-the-fly") after a suitable settling time. A suitable settling time can include the propagation times between elements in the path of transmission through IO cell 202. In some embodiments safety mechanism logic can provide the data to pattern checker element 208 when data is not received, or is not expected to be received, from system side logic and/or core logic. Accordingly safety mechanism logic may not pause traffic at IO pin 212.

Figure 3:
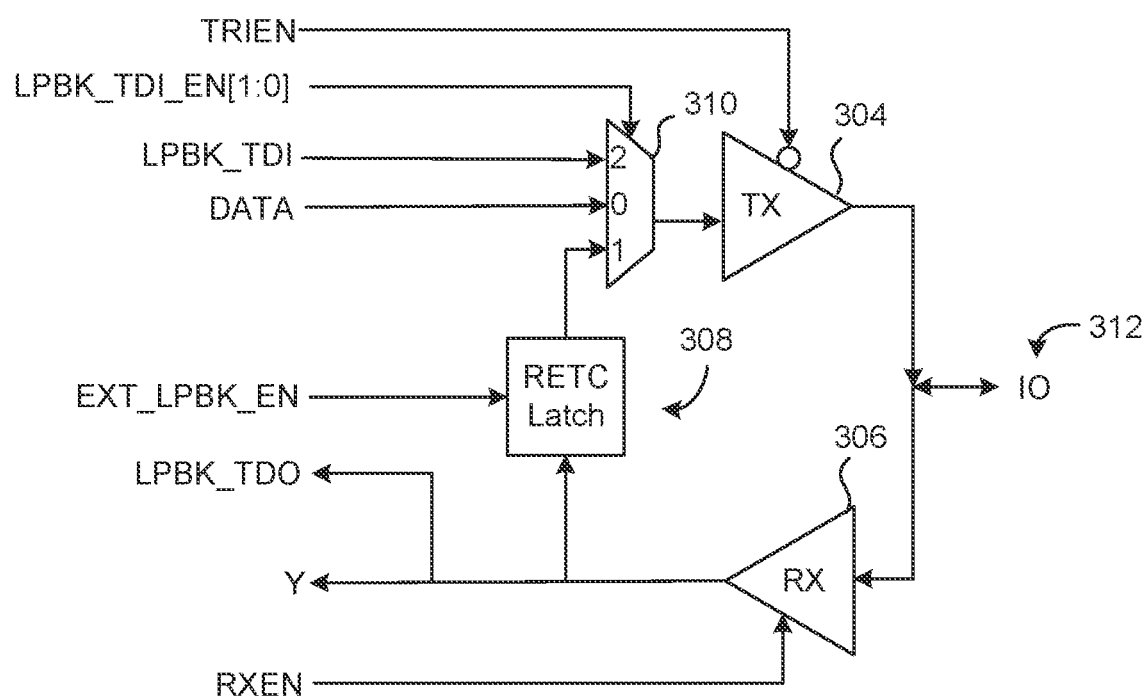
FIG. 3 illustrates an example IO cell including an external loopback safety mechanism, in accordance with some embodiments of the present disclosure.

FIG. 3 illustrates an example IO cell 302 including an external loopback safety mechanism, in accordance with some embodiments of the present disclosure. In some embodiments, system side logic can include a pattern generator, a pattern checker, and/or a pattern receiver. Safety mechanism logic of IO cell 302 can leverage the pattern generator, pattern checker and/or the pattern receiver of system side logic, in accordance with embodiments described herein. In some embodiments, the pattern checker can be or can include a logic gate, such as an exclusive- or (XOR) gate, as described above.

In some embodiments, safety mechanism logic can issue one or more signals to pause traffic between system side logic, core logic, and/or other logic of IO cell 302, as described above with respect to FIGS. 2A and 2B. Safety mechanism logic can issue another control signal (e.g., an external loop back enable signal or "EXT_LPBK_EN"). In some embodiments, the external loop back enable signal can enable a retention latch 308. Retention latch 308 (also referred to herein simply as "latch 308") can be configured to retain a state of IO cell 302. IO cell 302 can also include a multiplexor 310. Multiplexor 310 can be located upstream of TX buffer 304, in some embodiments. In some embodiments, latch 308 and multiplexor 310 can be should be as close as possible to the core logic.

In some embodiments, data is provided to multiplexor 310 through "DATA," as illustrated in FIG. 3. The provided data can be multiplexed with a loopback test data input signal (e.g., "LPBK_TDI") and an output of retention latch 308. As normal data traffic is propagated between core logic and system side logic, an enable signal for multiplexor 310 can be set at "LPBK_TD1_EN [1:0]" so that the provided data propagates through multiplexor 310 to TX buffer 304, Safety mechanism can update the enable signal for multiplexor 310 to be "LPBK_TDI_EN [1:0]" to allow for test data and/or data from latch 308 to be provided as input to multiplexor 310.

Safety mechanism logic can issue a "RXEN" signal to enable RX buffer 306 and initiate an external loopback test. Data to be programmed to one or more memory cells of a memory for a device (e.g., memory cells of memory subsystem 110) can be received by IO cell 302 and through RX buffer 306. In some embodiments, the data can have a particular pattern that is generated by a pattern generator of system side logic. The data at RX buffer 306 can be fed to latching component 308. Safety mechanism logic can then issue an enabling signal (e.g., "EXT_LPBK_EN") to cause a bit of the data transmitted to latching component 308 to be latched from data received from RX buffer 306 and retained at retention latch 308. In some embodiments, the bit can have a deterministic value. The latched data can be transmitted to or otherwise provided to multiplexor 310, where the data can be multiplexed with data of "DATA" and signal "LPBK_TDI," as described above. The multiplexed data can be provided to a pattern checker of system side logic (e.g., via IO pin 312, via another pin of IO cell 302, such as a "PAD" pin). A pattern receiver of system side logic can receive the multiplexed data, in some embodiments.

The pattern checker of system side logic can compare the pattern of the multiplexed data received from IO cell 302 to a pattern of the data provided to IO cell 302 (e.g., as generated by the pattern generator of system side logic). If a mismatch is detected based on the comparison, safety mechanism logic can issue a notification to core logic and/or system side logic indicating an error. The notification can be provided as a system interrupt, in some embodiments.

In some embodiments, in response to the pattern checker of the system side logic detecting a mismatch, safety mechanism logic can test the pattern checker logic. In some embodiments, safety mechanism logic can issue a lookback test data signal (e.g., "LPBK_TDI_EN") to enable "LPBK_TDI" as input of the path for TX buffer 304. In some embodiments, the "LPBK_TDI" signal can be driven from a source other than the pattern generator of system side logic. For example, the "LPBK_TD1" signal can be driven from a source within the core logic or as a top-level signal. In some embodiments, safety mechanism logic can update test data of "LPBK_TD1" to include an error pattern. The test data can be provided by safety mechanism logic to the pattern checker of system side logic and the pattern checker can determine whether an error is present between the original test data of "LPBK_TD1" and the test data including the error pattern by comparing the original test data to the test including the error pattern. If the pattern checker detects an error between the original test data and the test data including the error pattern, safety mechanism logic can determine that no issue is present with the pattern checker logic and a fault is present at the TX buffer 304. In some embodiments, safety mechanism logic can transmit a notification of the fault as an interrupt to the higher-level system after the error is detected between the original test data and the test data including the error pattern. If no error is detected between the original test data and the test data including the error pattern, safety mechanism logic can determine that there is an issue with the pattern checker logic and that a fault may not be present at TX buffer 304.

Figure 4:
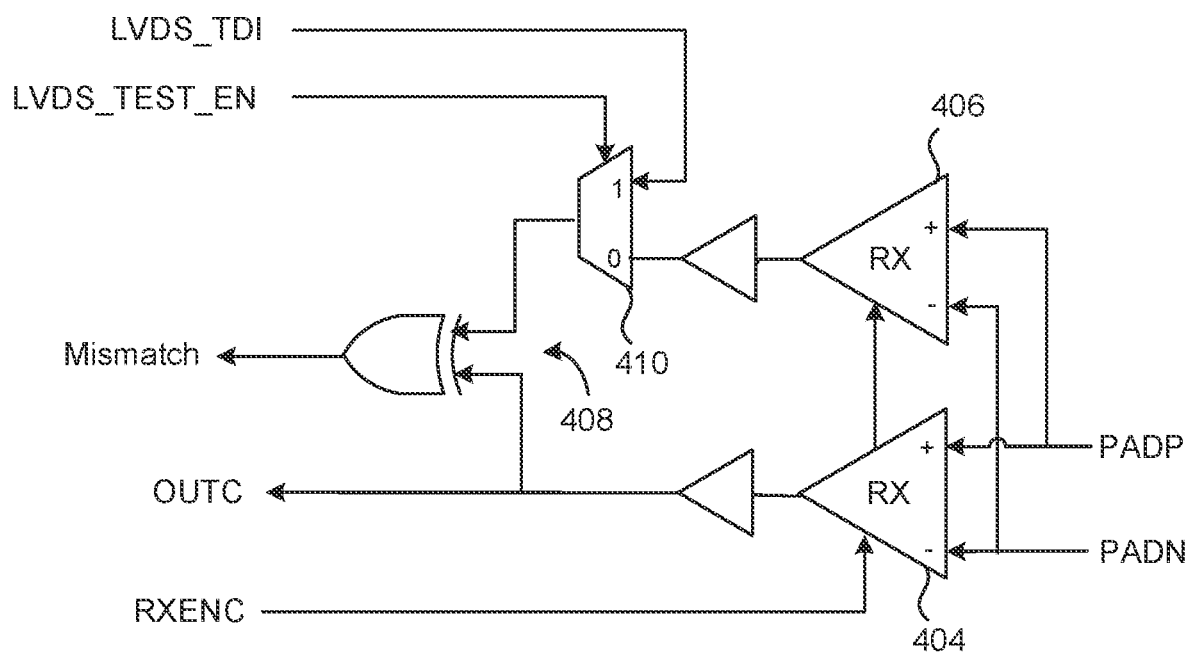
FIG. 4 illustrates an example low voltage differential signaling (LVDS) IO cell including a full hardware redundancy mechanism, in accordance with some embodiments of the present disclosure.

In some embodiments, the "LPBK_TDO" signal (e.g., indicating an output of RX buffer 306) can be sent to the source driving the "LPBK_TDI" signal for additional comparison by core logic and/or system side logic. As indicated previously, the above described mechanism enables safety mechanism logic to determine whether a mismatch detected by the pattern checker element of system side logic was caused by an issue with TX buffer 304, RX buffer 306, and/or TX- or RX-related logic within IO cell 310. Additionally, the above described mechanism can serve as an alternate safety mechanism other than pattern checker logic, in some embodiments FIG. 4 illustrates an example low voltage differential signaling (LVDS) receiving (RX) IO cell 402 including a full hardware redundancy mechanism, in accordance with some embodiments of the present disclosure. As illustrated in FIG. 4, LVDS RX IO cell 402 can include a receiving cell (e.g., RX cell 406). In some embodiments, IO cell 402 may not include any transmission buffers. In additional or alternative embodiments, IO cell 402 may include one or more transmission buffers, in accordance with embodiments of the present disclosure. In some embodiments, RX cell 404 can be configured to receive voltage signals (e.g., "PADP," "PADN," etc.) from system side logic via one or more wires connecting RX cell 404 to other components of system 100. IO cell 402 can transmit, to core logic and/or to system side logic, information indicating a difference between voltages of the received voltage signals and/or can convert the received voltage signals to a single level voltage signal. The single level voltage signal is represented as "OUTC," as illustrated in FIG. 4. "OUTC" can be used for mission traffic (e.g., data traffic that is safety critical for computing system 100) and/or for non-mission traffic (e.g., data traffic that is not safety critical for computing system 100), in some embodiments.

In some embodiments, IO cell 402 can include another RX cell 406, which can be a duplicate of RX cell 404. In other or similar embodiments, safety mechanism logic of IO cell 402 can replicate the functionality of RX cell 404 as duplicate RX cell 406. RX cell 406 can receive voltage signals from system side logic and can provide "OUTC" as an output, as indicated above. Safety mechanism logic can enable RX cell 404 by issuing an enable signal (e.g., "RXENC"), as described above. In some embodiments, RX cell 406 can additionally provide "OUTC" as an output based on the received voltage signals (e.g., "PADP," "PADN," etc.). An output of RX cell 406 (e.g., "OUTC") can be fed to a multiplexor 410. Safety mechanism logic can also issue a test data enable signal (e.g., "LVDS_TEST_EN" to enable multiplexor 410 and, in some embodiments, can provide a test data input signal (e.g., "LVDS_TDI") indicating test data to multiplexor 410. The output of multiplexor 410 and the output of RX cell 404 can fed to a comparator 408 (e.g., an XOR gate), which can compare the outputs to detect a mismatch between the outputs. An output of the comparator 408 can indicates any mismatch between the outputs of the multiplexor 410 and RX cell 404. If a mismatch is present between the outputs, safety mechanism logic can determine that a fault is present at RX cell 404 and can provide a notification of the fault by transmitting an interrupt to system side logic and/or core logic. In some embodiments, pattern checker element 408 can compare the outputs of multiplexor 410 and RX cell 404 during normal data traffic between system side logic and core logic (e.g., on-the-fly) without impacting or delaying the normal data traffic.

In some embodiments, safety mechanism logic can test whether comparator 408 is working correctly by issuing a test enable signal (e.g., "LVDS_TEST_EN"). By issuing the test enable signal, safety mechanism logic causes test data of "LVDS_TDI" to be provided as an input to comparator 408 instead of an output of multiplexor 410 (e.g., received from RX cell 406). If the comparator 408 detects a mismatch between the output of RX cell 404 and the test data of "LVDS_TDI," safety mechanism logic can determine that comparator 408 is working correctly. If no mismatch is detected, safety mechanism logic can determine that comparator 408 is not working correctly and can transmit a notification indicating that comparator 408 is not working correctly to core logic and/or system side logic (e.g., as an interrupt). In some embodiments, safety mechanism logic can test comparator 408 after data traffic between core logic and system side logic is disabled (e.g., when IO cell 402 is operating in non-mission mode).

Figure 5:
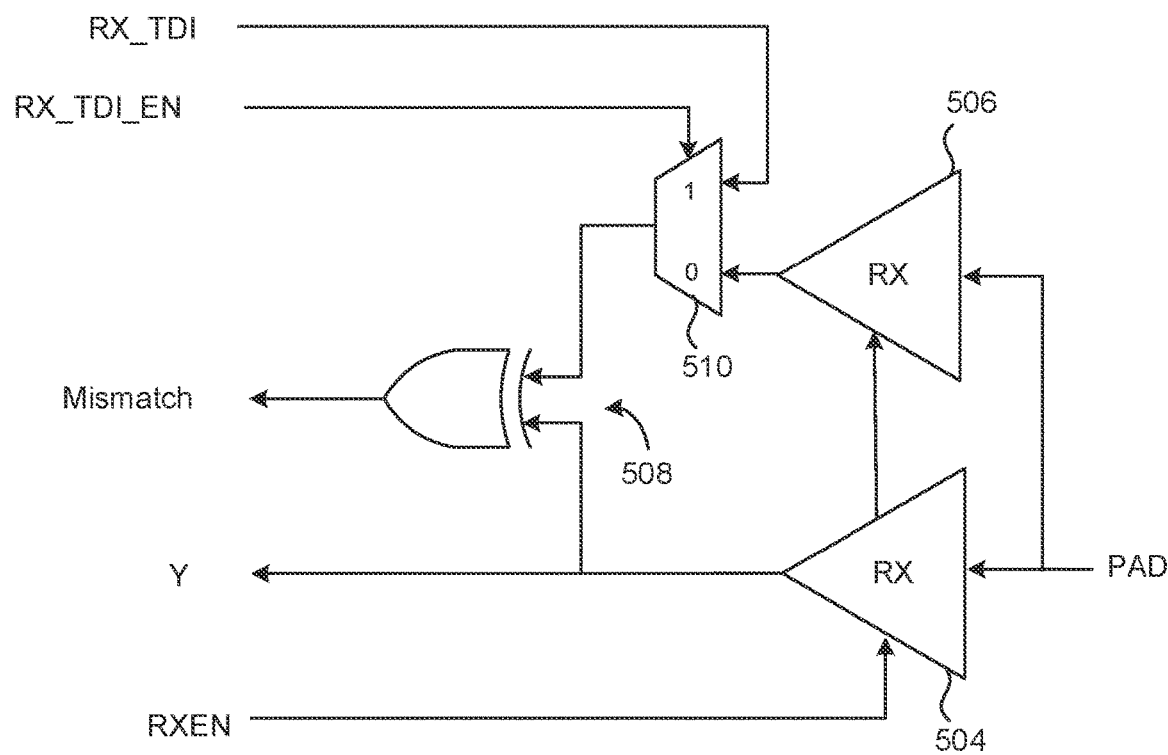
FIG. 5 illustrates an example input cell including a full hardware redundancy mechanism, in accordance with some embodiments of the present disclosure.

It should be noted that embodiments described with respect to FIG. 4 can be applied to other IO cells that are not LVDS RX cells. For example, embodiments described with respect to FIG. 4 can be applied to input-only IO cells including a full hardware redundancy mechanism, as illustrated in FIG. 5. FIG. 5 illustrates an example input-only IO cell 502, in accordance with some embodiments of the present disclosure. As illustrated in FIG. 5, input cell 502 can include an RX buffer 504. RX buffer 504 can be configured to receive data to be programmed to memory cells of system 100 (e.g., memory cells of memory subsystem 110) from system side logic. The data received from system side logic is illustrated as "PAD." Data can be received from RX buffer 504 to memory cells of the system 100, in some embodiments. The data received via RX buffer 504 is illustrated as "Y." Input cell 502 can include a duplicate RX buffer 506, in some embodiments. In other or similar embodiments, safety mechanism logic can duplicate the functionality of RX buffer 506, as described above.

Safety mechanism logic can enable RX buffer 504 by issuing enable signal "RXEN," in accordance with previously described embodiments. "PAD" can be provided as input to RX buffer 504 and/or duplicate RX buffer 506, in some embodiments. In some embodiments, "DATA" of RX buffer 504 can be provided to core logic and/or as an input to comparator 508. In additional or alternative embodiments, "DATA" of RX buffer 506 can be provided to duplicate RX buffer 506. In some embodiments, an output of RX buffer 506 can be provide as input to a multiplexor 510. Safety mechanism logic can issue an enable signal (e.g., "RX_TDI_EN") to enable multiplexor 510. The enable signal can also provide test data (e.g., of signal "RX_TDI") as input to multiplexor 510. Multiplexor 510 can multiplex the output of RX buffer 506 with test data of "RX_TDI." An output of multiplexor 510 can be fed to comparator 508.

Comparator 508 can be or can include a logic gate (e.g., an XOR logic gate) in some embodiments. Comparator 508 can compare an output of RX buffer 504 to an output of multiplexor 510 to determine a mismatch between the outputs. If comparator 508 detects a mismatch between the outputs, safety mechanism logic can determine that a fault has occurred at RX buffer 504 and can transmit a notification of the fault to core logic and/or system side logic, as described above. If comparator 508 does not detect a mismatch between the outputs, safety mechanism logic can determine that a fault has not occurred at RX buffer 504. Safety mechanism logic can perform a test to determine whether logic of comparator 508 is operating correctly, in accordance with previously described embodiments. For example, "RX-TDI" can be used as test data to test comparator 508 according to the same or similar techniques described for "LPBK_TDI" and other test data herein.

Figure 6:
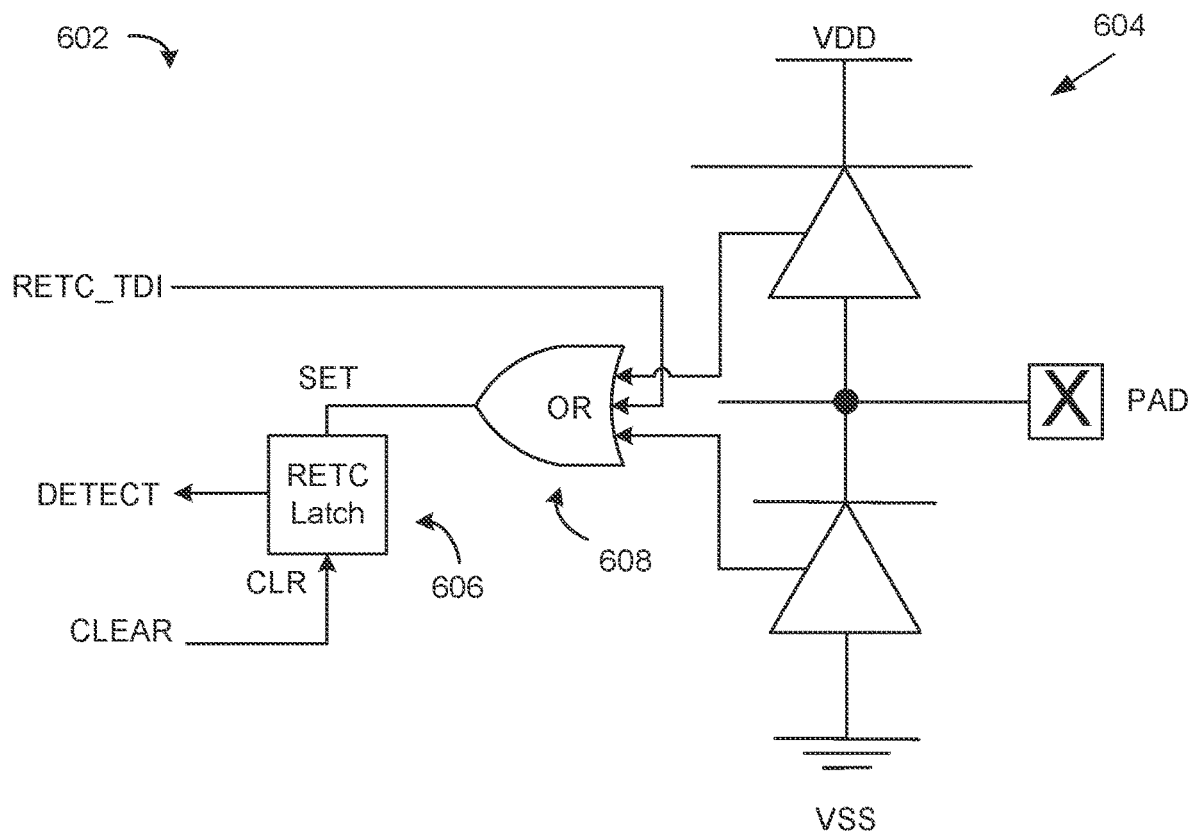
FIG. 6 illustrates a diagnostic indicator for an example diode and clamp cell, in accordance with some embodiments of the present disclosure.

FIG. 6 illustrates an example IO cell 602 including a diagnostic indicator for an example diode and clamp cell 604, in accordance with some embodiments of the present disclosure. A clamp refers to an electronic circuit that fixes the positive or negative peak excursions of a signal. A claim cell for IO cell 602 can fix the positive or negative peak excursions of a signal received by IO cell 602 (e.g., from system side logic, from core logic, etc.). Using a clamp as a safety mechanism can help limit the voltage to a certain clamp value and prevent any damage to the IO cell 602. As illustrated in FIG. 6, the clamp cell 604 is placed closest to "PAD." "PAD," as illustrated in FIG. 6, refers to a region of an integrated circuit that a component lead (e.g., a lead for IO cell 602) is soldered to. When a surge occurs at system 100, clamps of clamp cell 602 clip the voltage of a signal provided to IO cell 602 to the limits prescribed by clamp cell 602 (e.g., positive or negative peak excursion limits) and therefore protect the rest of the circuitry downstream from clamp cell 604.

As illustrated in FIG. 6, IO cell 602 can include a retention latch 606. An output from the activation logic of the clamp cell 604 is brought out from the diodes/clamps of claim cell 604. An event indicating the output can be provided to retention latch 606 (e.g., through its SET input). Retention latch 606 can provide an output indicating a detection of the event (e.g., "DETECT") . . . . In some embodiments, a signal indicating the detection can be transmitted as an interrupt (e.g., at a higher signal level) to system side logic and/or core logic. The signal can be transmitted after a suitable settling time, in some embodiments. Once a notification indicating acknowledgement of the detection signal is received, safety mechanism logic can remove data indicating the detection event from retention latch 606 (e.g., by issuing a "CLEAR" signal). In order to ensure that the latch 606 is capturing properly, an integrity check input (e.g., "RETC_TDI") can be provided as input to a OR-component 608, which can perform an OR comparison of the event indicating the output from the activation logic of claim cell 604 to the "RETC_TDI" signal. A "SET" signal is provided as an output of the OR component 608 and provided as input to latch 606.

In some embodiments, safety mechanism logic can initiate a test mode at IO cell 602. During the test mode, the OR component 608 can create an assertion on the detect signal using the "RETC_TDI" signal to confirm if the latch is working. If so, safety mechanism logic can clear data from latch 606, in some embodiments. Accordingly, safety mechanism logic can use the "RETC_TDI" performs as a redundancy checker for IO cell 602.

Figure 7:
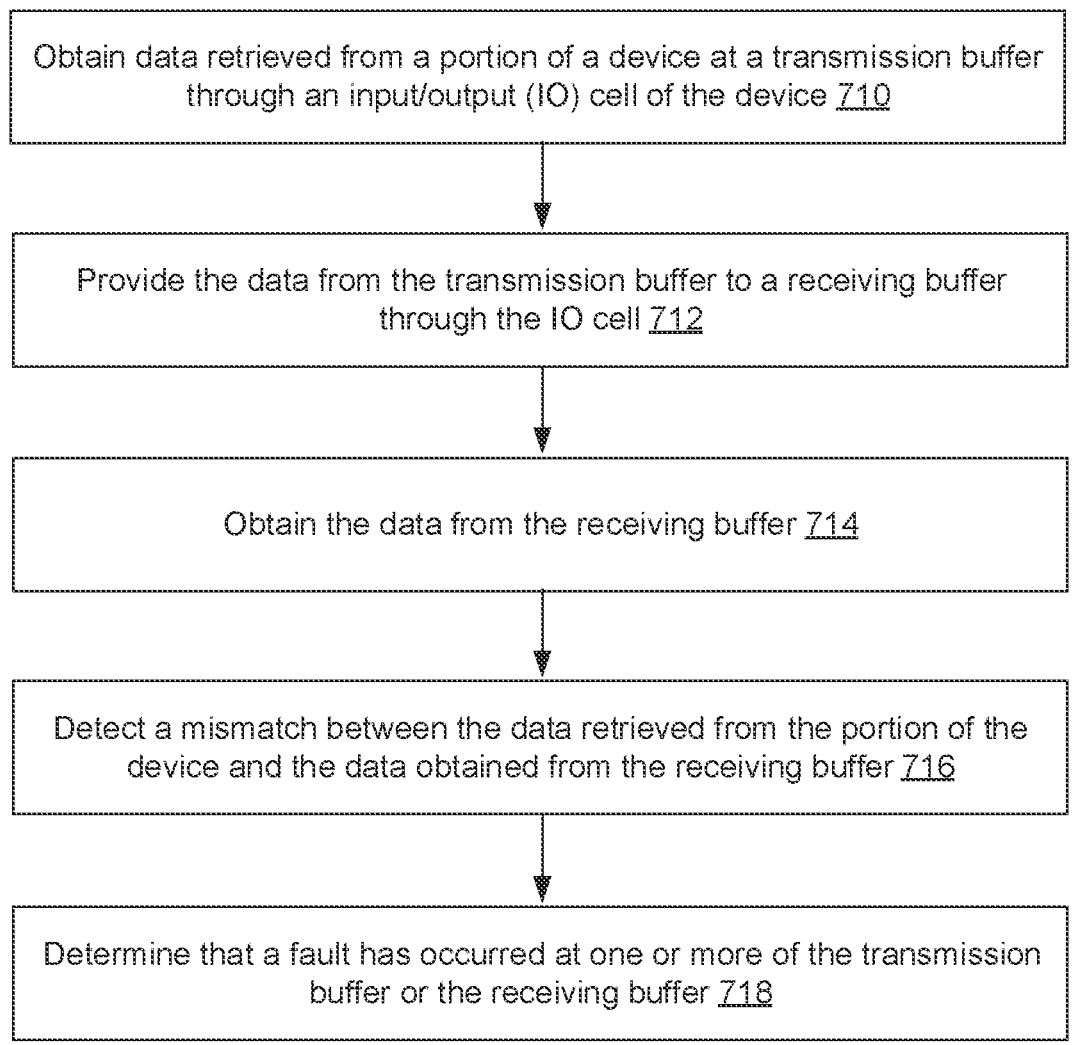
FIG. 7 is a flow diagram illustrating an example method for a functional safety mechanism of an IO cell, in accordance with some embodiments of the present disclosure.
Figure 8:
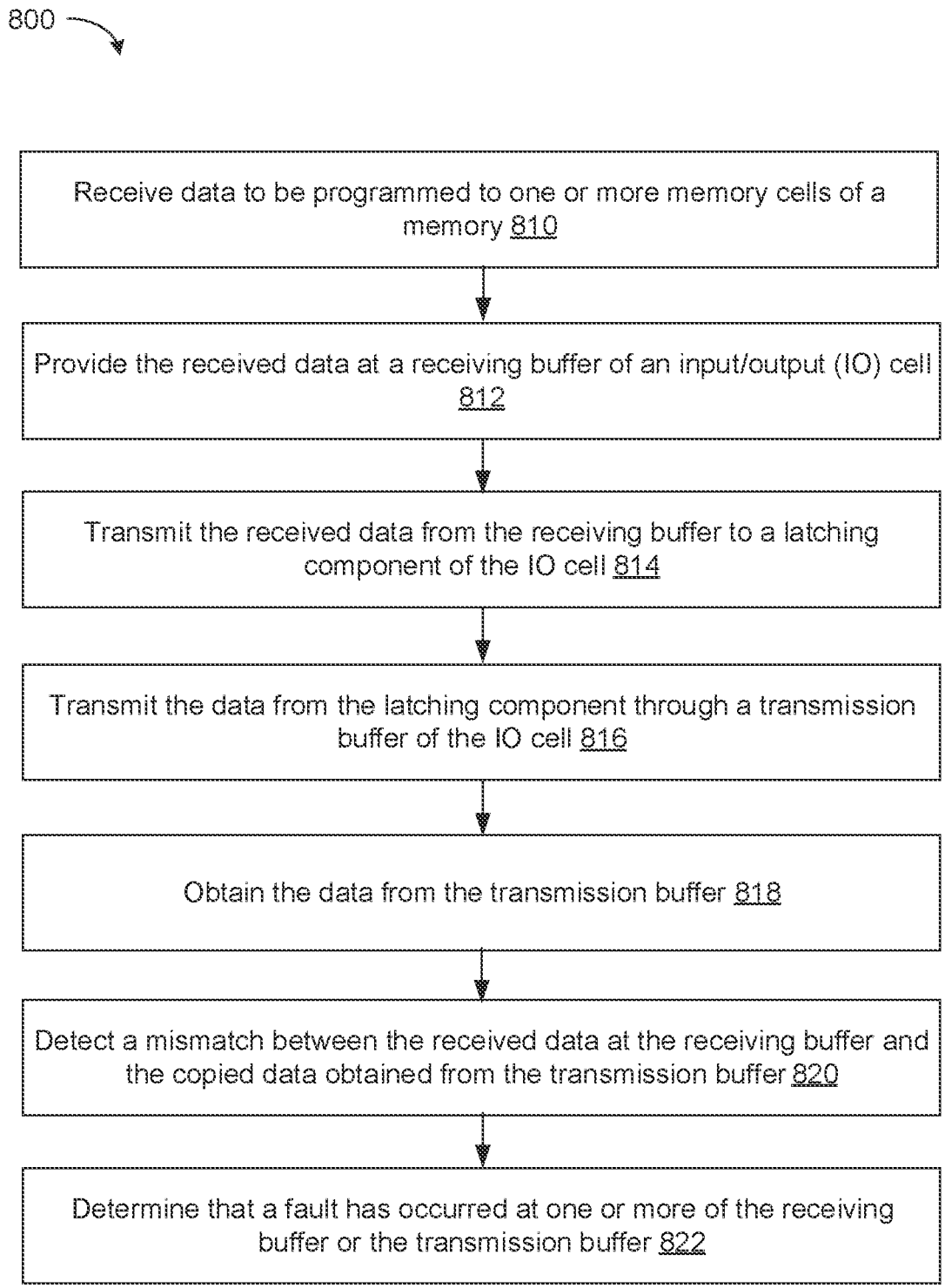
FIG. 8 is a flow diagram illustrating another example method for a functional safety mechanism of an IO cell, in accordance with some embodiments of the present disclosure.

FIGS. 7, 8 and 9 are is a flow diagrams illustrating example methods 700, 800, 900 for a functional safety mechanism of an IO cell, in accordance with some embodiments of the present disclosure. Methods 700, 800, and/or 900 can be performed by processing logic that can include hardware (circuitry, dedicated logic, etc.), software (e.g., instructions run on a processing device), or a combination thereof. In one implementation, some or all of the operations of methods 700, 800, and/or 900 can be performed by one or more components of system 100 of FIG. 1. In some embodiments, some or all of the operations of methods 700, 800, and/or 900 can be performed by safety mechanism logic described with respect to FIGS. 2-6 above.

Referring now to FIG. 7, at block 710, processing logic can obtain data retrieved from a portion of a device at a transmission buffer through an IO cell of the device. In some embodiments, the IO cell can correspond to IO cell 202A and/or IO cell 202B of FIGS. 2A and/or 2B. In such embodiments, the transmission buffer can correspond to transmission buffer 204 of IO cell 202A and/or IO cell 202B. In some embodiments, processing logic can obtain the data at the transmission buffer in response to detecting a signal to initiate a fault detection protocol at the IO cell. The processing logic can disable communication between core logic of an integrated circuit of the device and one or more components of the device in response to detecting the signal, in some embodiments.

At block 712, processing logic can provide the data from the transmission buffer to a receiving buffer through the IO cell. In some embodiments, the receiving buffer can correspond to receiving buffer 204 of IO cell 202A and/or IO cell 202B. At block 714, processing logic can obtain the data from the receiving buffer. At block 716, processing logic can detect a mismatch between the data retrieved from the portion of the device and the data obtained from the receiving buffer. Processing logic can detect the mismatch based on an output of a pattern checker (e.g., pattern checker element 208) and/or a comparator element, in accordance with previously described embodiments.

At block 718, processing logic can determine that a fault has occurred at one or more of the transmission buffer or the receiving buffer. In some embodiments, processing logic can determine that the fault has occurred by obtaining testing data via a dedicated testing pin of a multiplexor component coupled to the transmission buffer. Processing logic can provide the testing data to the receiving buffer and then obtain the testing data from the receiving buffer. In response to detecting a second mismatch (e.g., based on an output of pattern checker element 208) between the testing data obtained via the dedicated testing pin of the multiplexor component and the testing data obtained from the receiving buffer, processing logic can determine that the fault has occurred at the receiving buffer. Responsive to determining that the testing data obtained via the dedicated testing pin of the multiplexor component corresponds to the testing data obtained from the receiving buffer, processing logic can determine that the fault has occurred at the transmission buffer.

In some embodiments, processing logic can transmit a signal to a processing component of the device (e.g., system side logic) indicating the fault at the one or more of the transmission buffer, the receiving buffer, or the communication path between the device and the transmission buffer. The signal can include a system interrupt, in some embodiments.

In additional or alternative embodiments, processing logic can obtain additional data from the transmission buffer and the receiving buffer and can provide the obtained additional data as input to an exclusive- or (XOR) logic gate of the IO cell. The XOR logic gate can be a component of pattern checker element 208, as described above. Processing logic can determine, based on an output of the XOR logic gate, whether a second mismatch is detected for the additional data at the transmission buffer and the receiving buffer. In response to determining that the second mismatch is not detected for the additional data at the transmission buffer and the receiving buffer, processing logic can determine that the first mismatch was detected in error.

As indicated above, FIG. 8 is a flow diagram 800 illustrating another example method for a functional safety mechanism of an IO cell, in accordance with some embodiments of the present disclosure. At block 810, processing logic receives data to be programmed to one or more memory cells of a memory (e.g., memory sub-system 110). At block 812, processing logic can provides the received data at a receiving buffer of an IO cell. In some embodiments, the IO cell can correspond to IO cell 302 described with respect to FIG. 3. In such embodiments, the receiving buffer can correspond to RX buffer 306. At block 814, processing logic transmits the received data from the receiving buffer to a latching component of the IO cell. In some embodiments, the latching component can correspond to latching component 308. At block 816, processing logic can transmit the data from the latching component through a transmission buffer of the IO cell. In some embodiments, the data from the latching component includes a latched bit of data. The transmission buffer can correspond to TX buffer 304, in some embodiments.

At block 818, processing logic can obtain the data from the transmission buffer. At block 820, processing logic can detect a mismatch between the received data at the receiving buffer and the data obtained from the transmission buffer. In some embodiments, processing logic can provide the data from the transmission buffer to a data pattern checking component of a device including the IO cell, in accordance with embodiments described with respect to FIG. 3. Processing logic can detect the mismatch between the received data at the receiving buffer and the data obtained from the transmission buffer based on an indication of the mismatch received from the data pattern checking component.

At block 822, processing logic determines that a fault has occurred at one or more of the receiving buffer or the transmission buffer. In some embodiments, processing logic can determine that the fault has occurred by obtaining test data via a dedicated testing pin of a multiplexor component coupled to the transmission buffer. Processing logic can provide the testing data to the transmission buffer and obtain the testing data from the transmission buffer. In response to detecting a second mismatch between the testing data and the testing data obtained from the transmission buffer, processing logic can determine that the fault has occurred at the transmission buffer. Processing logic can determine that the fault has occurred at the transmission buffer based on an indication of the second mismatch received from the data pattern checking component, as described above.

In some embodiments, processing logic can transmit a signal to a processing component of the device including the IO cell (e.g., system side logic) indicating the fault at the one or more of the receiving buffer or the transmission buffer. The signal can include a system interrupt, in some embodiments.

As indicated above, FIG. 9 is a flow diagram illustrating another example method 900 for a functional safety mechanism of an IO cell, in accordance with some embodiments of the present disclosure. At block 910, processing logic obtains first data at a transmission buffer through an IO cell through a device. The IO cell can correspond to IO cell 202 and the transmission buffer can correspond to TX buffer 204, in some embodiments. At block 912, processing logic can obtain second data at a receiving buffer through the IO cell. The receiving buffer can correspond to RX buffer 206, in some embodiments. At block 914, processing logic can provide the first data and the second data as input to an exclusive- or (XOR) logic gate of the IO cell. At block 916, processing logic can determine, based on an output of the XOR logic gate, that a mismatch is present between the first data and the second data. The mismatch can indicate a fault at one or more of the transmission buffer or the receiving buffer, in some embodiments. At block 918, processing logic can transmit a signal indicating a fault at one or more of the transmission buffer or the receiving buffer, in some embodiments.

Figure 10:
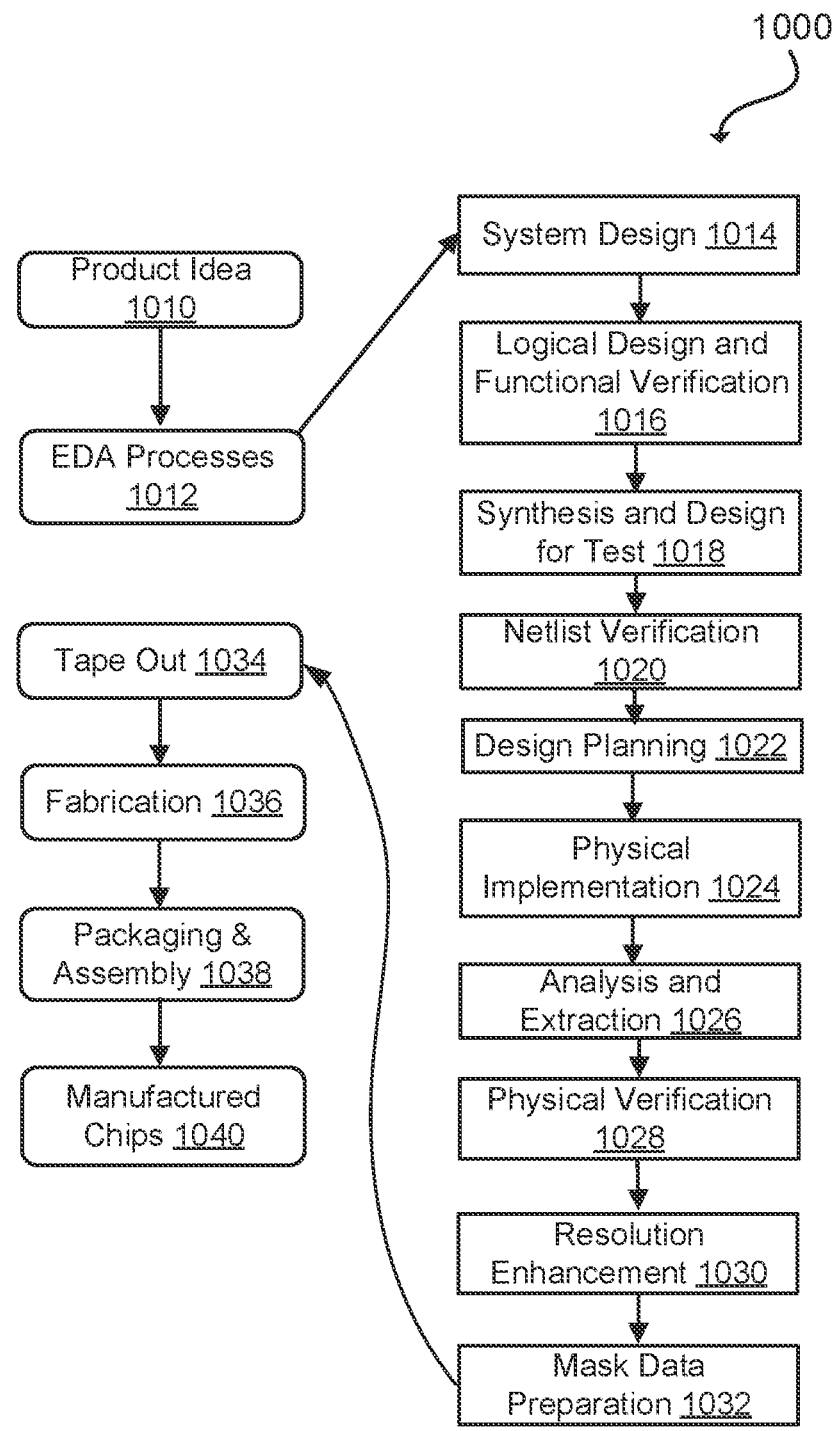
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 10. The processes described by be enabled by EDA products (or tools).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as DRC constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 11:
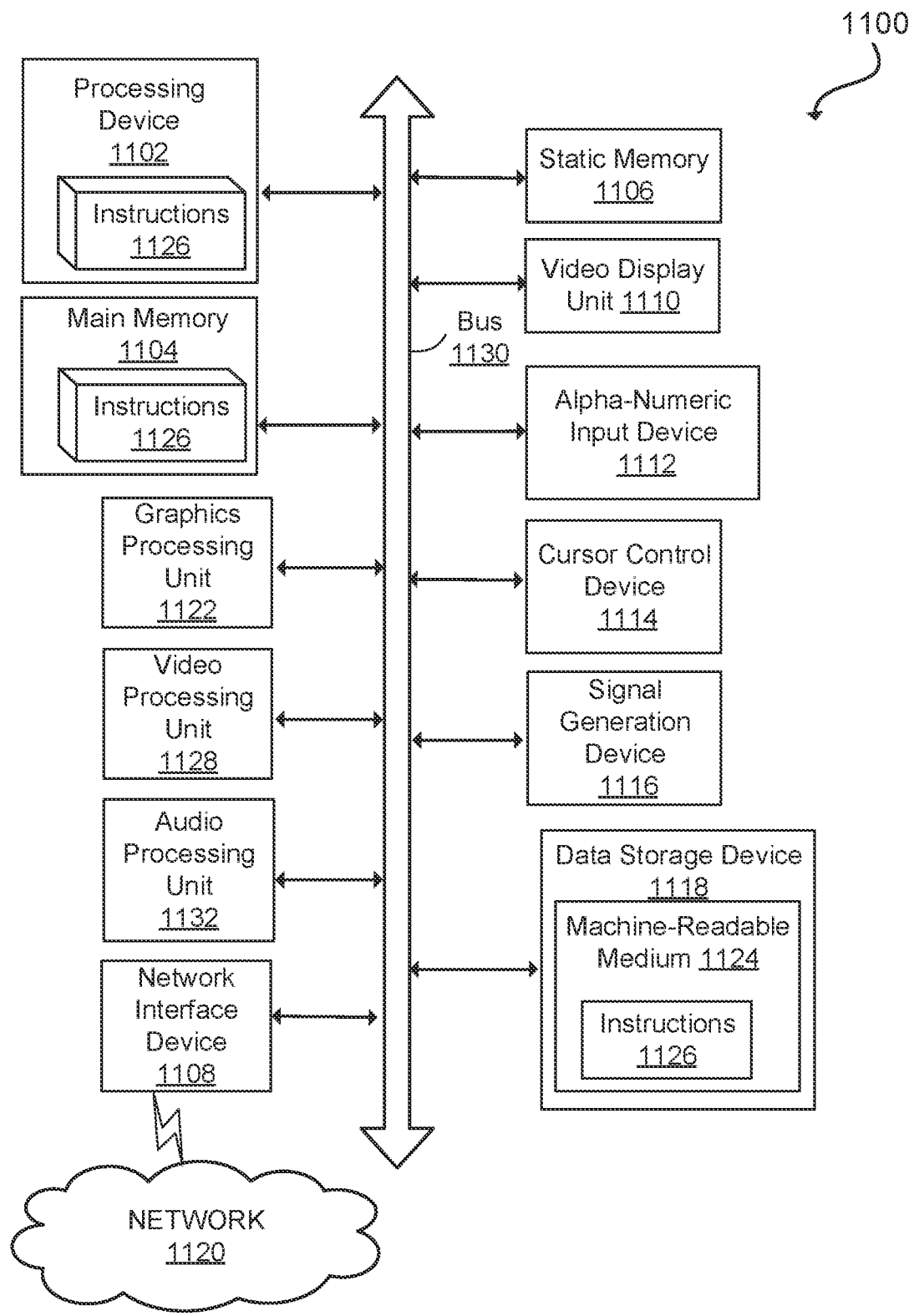
FIG. 11 depicts an abstract diagram of an example computer system in which embodiments of the present disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    obtaining data retrieved from a portion of a device at a transmission buffer through an input/output (IO) cell of the device;
    providing the data obtained from the transmission buffer to a receiving buffer through the IO cell;
    obtaining the data from the receiving buffer;
    responsive to detecting a first mismatch between the data retrieved from the portion of the device and the data obtained from the receiving buffer, determining that a fault has occurred at one or more of the transmission buffer or the receiving buffer;
    obtaining testing data via a dedicated testing pin of a multiplexor component coupled to the transmission buffer;
    providing the testing data to the receiving buffer;
    obtaining the testing data from the receiving buffer; and
    responsive to detecting a second mismatch between the testing data obtained via the dedicated testing pin of the multiplexor component and the testing data obtained from the receiving buffer, determining that the fault has occurred at the receiving buffer.

2. The method of claim 1, further comprising:
    responsive to determining that the testing data obtained via the dedicated testing pin of the multiplexor component corresponds to the testing data obtained from the receiving buffer, determining that the fault has occurred at the transmission buffer.

3. The method of claim 1, further comprising:
    detecting a signal to initiate a fault detection protocol at the IO cell, wherein the data retrieved from the portion of the device at the transmission buffer through the IO cell is obtained in response to the detected signal.

4. The method of claim 3, further comprising:
    responsive to detecting the signal to initiate the fault detection protocol at the IO cell, disabling communication between core logic of an integrated circuit (IC) of the device and one or more other components of the device.

5. The method of claim 1, further comprising:
    transmitting a signal to a processing component of the device indicating the fault at the one or more of the transmission buffer or the receiving buffer.

6. The method of claim 5, wherein the signal comprises a system interrupt.

7. The method of claim 1, further comprising:
    obtaining additional data from the transmission buffer and the receiving buffer;
    providing the obtained additional data as input to an exclusive- or (XOR) logic gate of the IO cell;
    determining, based on an output of the XOR logic gate, whether a second mismatch is detected for the additional data; and
    responsive to determining that the second mismatch is not detected for the additional data, determining that the first mismatch was detected in error.

8. The method of claim 1, further comprising:
    transmitting one or more enable signals to enable at least one of the transmission buffer or the receiving buffer.

9. A system comprising:
    a memory storing instructions; and
    a processor, coupled with the memory and to execute the instructions, the instructions, when executed, to cause the processor to:
    receive data to be programmed to one or more memory cells of the memory;
    provide the received data to a receiving buffer of an input/output (IO) cell;
    transmit the received data from the receiving buffer to a latching component of the IO cell;
    transmit the data from the latching component through a transmission buffer of the IO cell;
    obtain the data from the transmission buffer; and
    responsive to detecting a first mismatch between the received data at the receiving buffer and the data obtained from the transmission buffer, determine that a fault has occurred at one or more of the receiving buffer or the transmission buffer, wherein to determine that the fault has occurred at the one or more of the receiving buffer or the transmission buffer the processor is to:
    obtain testing data via a dedicated testing pin of a multiplexor component coupled to the transmission buffer;
    provide the testing data to the transmission buffer;
    obtain the testing data from the transmission buffer; and
    responsive to detecting a second mismatch between the testing data obtained via the dedicated testing pin and the testing data obtained from the transmission buffer, determine that the fault has occurred at the transmission buffer.

10. The system of claim 9, wherein the data transmitted from the latching component to the transmission buffer comprises a latched bit of data.

11. The system of claim 9, wherein the processor is further to:
provide the data from the transmission buffer to a data pattern checking component of a device including the IO cell.

12. The system of claim 10, wherein to detect the first mismatch between the received data at the receiving buffer and the data obtained from the transmission buffer, the processor is to:
receive an indication of the first mismatch from the data pattern checking component of a device including the IO cell.

13. The system of claim 9, wherein to detect the second mismatch between the testing data obtained via the dedicated testing pin and the testing data obtained from the transmission buffer, the processor is to:
receive an indication of the second mismatch from a data pattern checking component of a device including the IO cell.

14. The system of claim 9, wherein the processor is further to:
transmit a signal to a processing component of a device including the IO cell indicating the fault at the one or more of the receiving buffer or the transmission buffer.

15. The system of claim 14, wherein the signal comprises a system interrupt.

16. A method comprising:
identifying a first data stream of a transmission buffer through an input/output (IO) cell of a device;
identifying a second data stream of a receiving buffer through the IO cell;
providing the first data stream and the second data stream as an input to an exclusive- or (XOR) logic gate of the IO cell;
determining, based on an output of the XOR logic gate, whether a first mismatch is detected between the first data stream and the second data stream, wherein the first mismatch indicates a fault at one or more of the transmission buffer or the receiving buffer;
responsive to determining that the first mismatch is detected between the first data and the second data, transmitting, to a processor of the device, a signal indicating the fault at the one or more of the transmission buffer or the receiving buffer;
obtaining testing data via a dedicated testing pin of a multiplexor component coupled to the transmission buffer;
providing the testing data to the receiving buffer;
obtaining the testing data from the receiving buffer; and
responsive to detecting a second mismatch between the testing data obtained via the dedicated testing pin of the multiplexor component and the testing data obtained from the receiving buffer, determining that the fault has occurred at the receiving buffer.

17. The method of claim 16, further comprising:
responsive to determining that the testing data obtained via the dedicated testing pin of the multiplexor component corresponds to the testing data obtained from the receiving buffer, determining that the fault has occurred at the transmission buffer.

* * * * *